United States Patent
Su

(10) Patent No.: US 6,643,126 B2
(45) Date of Patent: Nov. 4, 2003

(54) AUTOMATIC TEMPERATURE DISPLAY AND FAN ROTARY SPEED ADJUSTING DEVICE

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 0 days.

(21) Appl. No.: 10/066,578

(22) Filed: Feb. 6, 2002

(65) Prior Publication Data

US 2003/0138325 A1 Jul. 24, 2003

(30) Foreign Application Priority Data

Jan. 18, 2002 (TW) ........................................ 091200374

(51) Int. Cl.[7] ................................................ G06F 1/20
(52) U.S. Cl. ................... 361/685; 361/724; 439/928.1; 700/278
(58) Field of Search .................. 361/685, 686, 361/687, 724–727, 694–695, 697; 439/928.1; 700/275–276, 278–279, 299; 702/130, 132

(56) References Cited

U.S. PATENT DOCUMENTS 5,654,874 A * 8/1997 Suzuki ...................... 361/685
6,356,441 B1 * 3/2002 Claprood .................. 361/685
6,388,878 B1 * 5/2002 Chang ...................... 361/687
6,460,098 B1 * 10/2002 Paul ............................ 710/62

* cited by examiner

Primary Examiner—Darren Schuberg
Assistant Examiner—Hung Van Duong
(74) Attorney, Agent, or Firm—Troxell Law Office PLLC

(57) ABSTRACT

An automatic temperature display and fan rotary speed adjusting device having an operation display panel which is capable of being connected to a disk drive frame, a cover plate or a computer panel. The operation display panel is combined to the computer panel directly, or to the 5.25 inches disk drive frame, or to the 5.25 inches disk drive cover plate, or to the 3.5 inches disk drive cover plate, in each case, the operation display panel is installed with a control circuit board, a thermometer and a connecting terminal connected to a heat dissipating fan. The window is connected to the thermometer. The thermometer is fixed or installed to the hard disk drive, central processing unit or computer. An IC in a circuit board will display the temperature measured by the thermometer and the rotary speed of the fan on the window. A circuit of the fan adjusting button is connected to the circuit board and electric heat dissipating fan. Thus, the rotary speeds of the fans is controllable by the fan adjusting button directly.

4 Claims, 7 Drawing Sheets

AUTOMATIC TEMPERATURE DISPLAY AND FAN ROTARY SPEED ADJUSTING DEVICE

FIELD OF THE INVENTION

The present invention relates to fan adjusting devices, and particularly to an automatic temperature display and fan rotary speed adjusting device.

BACKGROUND OF THE INVENTION

Since the rapid development of computers, the capacity of computer memory has increased rapidly and thereby, the heat dissipating of a computer, related elements, and the peripherals thereof, such as hard disk drives, flopping disk drives, compact disk drives, central processing unit, power supplies and others is increased. If the heat can not be dissipated dramatically, it will induce that the components of the computer will be destroyed.

In general, fans are installed for dissipating heats from hard disk drives, flopping disk drives, compact disk drives, central processing unit, power supplies and others. Fans provide air flow in the internal space of a computer so as to exhaust heat outwards to reduce the temperature in the computer, Installing fans in the computer is a general technology in the prior art. However, the volume of data to be processed is greater and greater and speed of the CPUs become quicker and quicker, as a result, the fan is overload, while in most cases, the malfunction of the fans can not be found. Many reasons will cause the temperature increment of a computer and thus only fans can not completely resolve the problem of overheating.

In general, a computer has no effective mechanism to control the fans, even no means to display the temperature in a computer. Therefore, generally, users can not know the conditions of fans and temperature in a computer and thus the destroy of the fan can not be known by the users. As a consequence, users can not adapt an effective action as the fan is destroyed.

SUMMARY OF THE INVENTION

Accordingly, the primary object of the present invention is to provide an automatic temperature display and fan rotary speed adjusting device having an operation display panel which is capable of being connected to a disk drive frame, a cover plate or a computer panel. The operation display panel is combined to the computer panel directly, or to the 5.25 inches disk drive frame, or to the 5.25 inches disk drive cover plate, or to the 3.5 inches disk drive cover plate, in each case, the operation display panel is installed with a control circuit board, a thermometer and a connecting terminal connected to a heat dissipating fan. The window is connected to the thermometer. The thermometer is fixed or installed to the hard disk drive, central processing unit or computer. An IC in a circuit board will display the temperature measured by the thermometer and the rotary speed of the fan on the window. A circuit of the fan adjusting button is connected to the circuit board and electric heat dissipating fan. Thus, the rotary speeds of the fans are controllable by the fan adjusting button directly.

The various objects and advantages of the present invention will be more readily understood from the following detailed description when read in conjunction with the appended drawing.

DETAILED DESCRIPTION OF THE PREFERRED EMBODIMENTS

Figure 1:
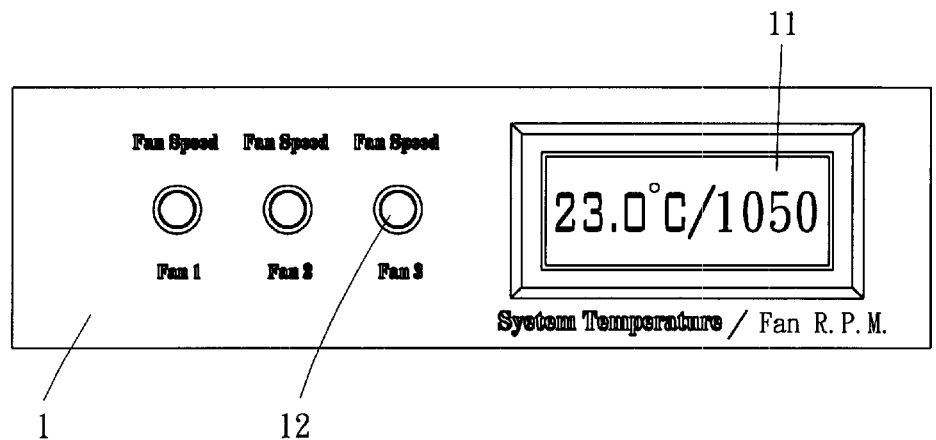
FIG. 1 is a front view of the operation display panel of the present invention.
Figure 2:
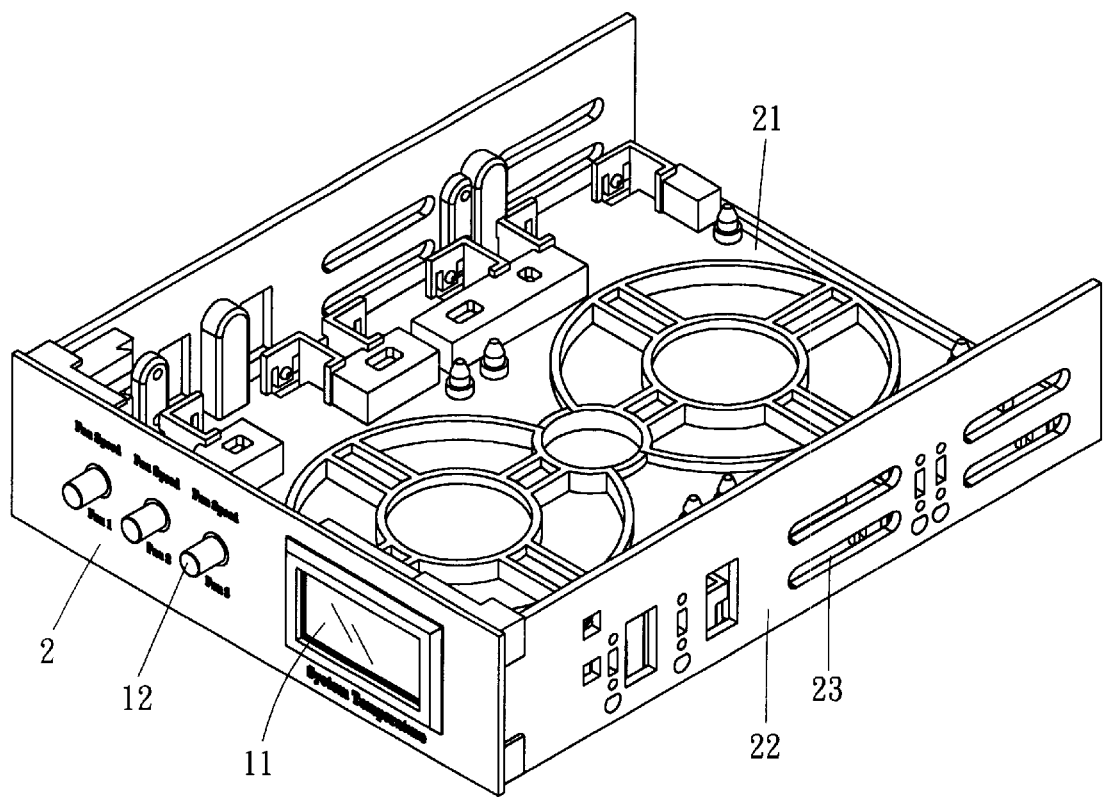
FIG. 2 is a perspective view about the 5.25 inches disk drive frame of the operation display panel of the present invention.
Figure 3:
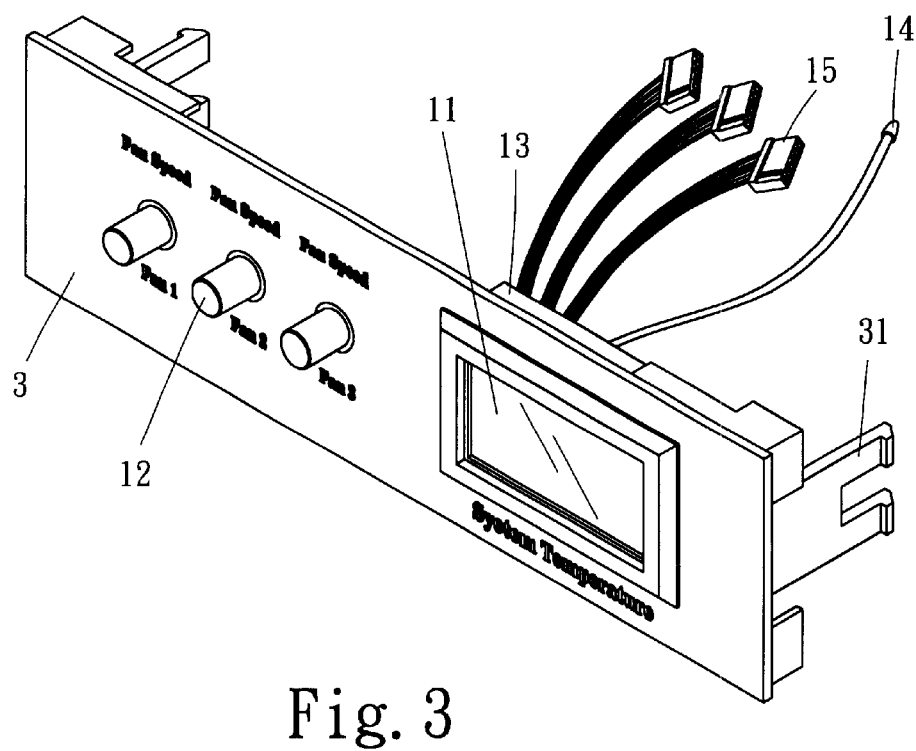
FIG. 3 is a perspective view about the 5.25 inches disk drive cover plate of the operation display panel of the present invention.
Figure 4:
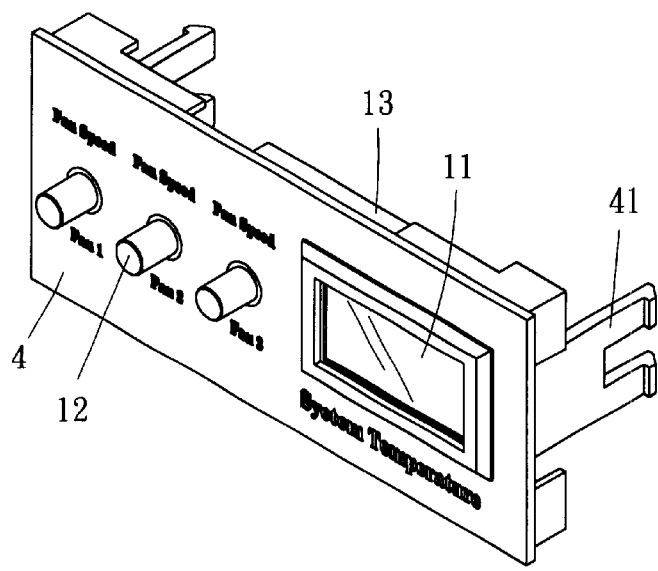
FIG. 4 is a perspective view of the 3.5 inches disk drive cover plate of the operation display panel of the present invention.
Figure 5:
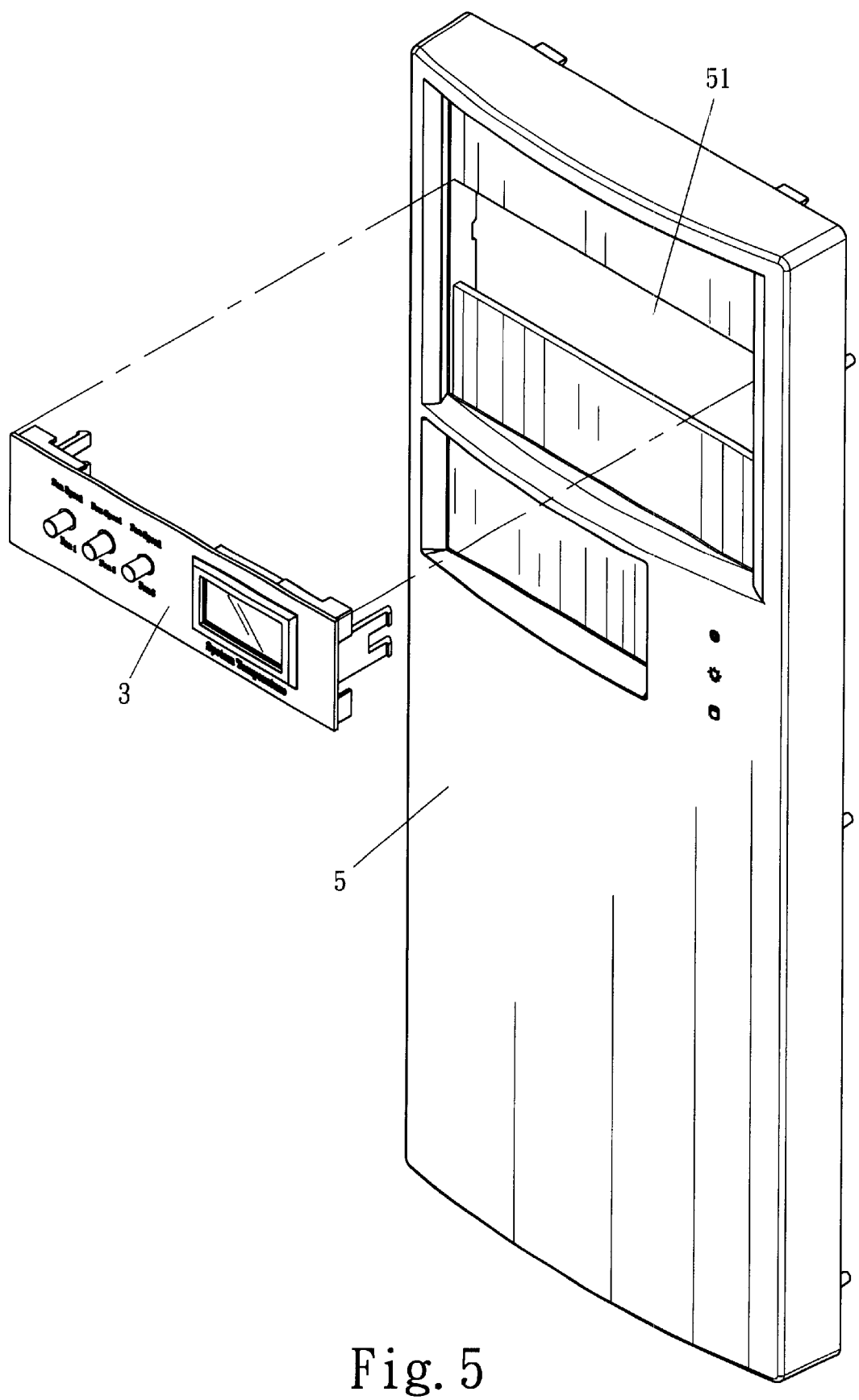
FIG. 5 is an exploded perspective view of the 5.25 inches disk drive cover plate and computer panel 5 of the operation display panel of the present invention.
Figure 6:
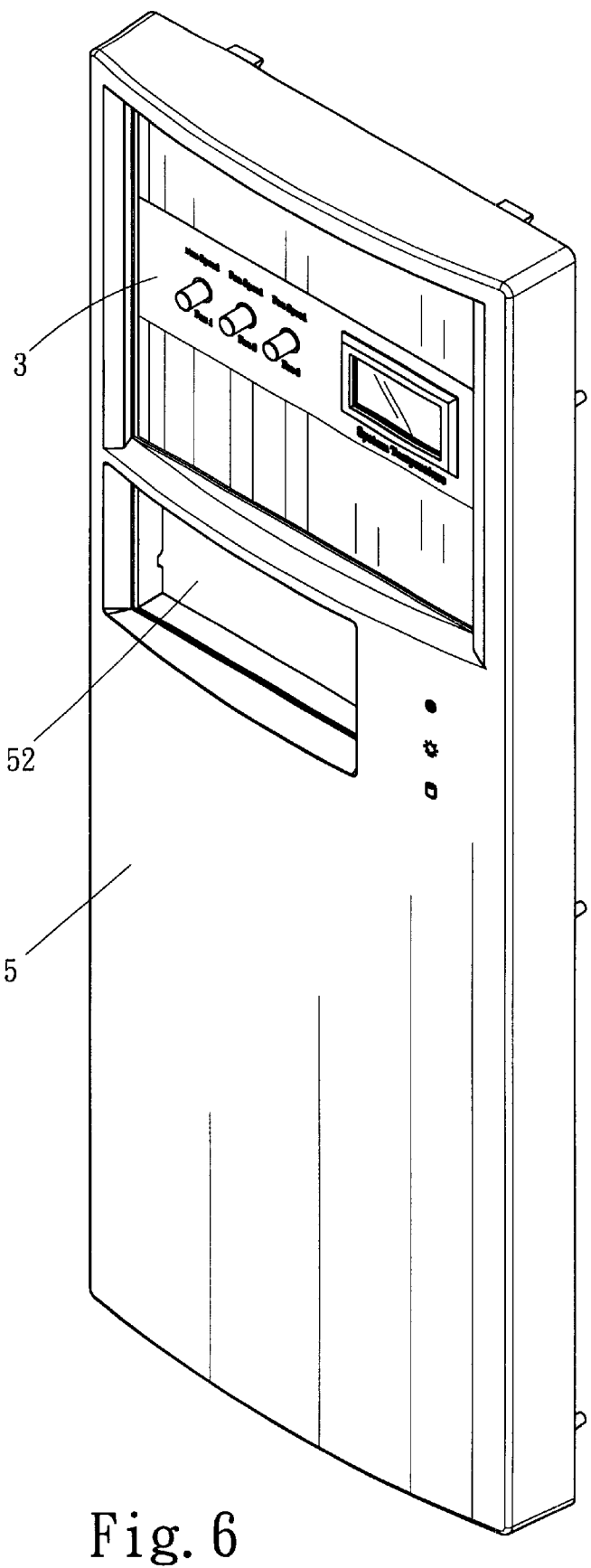
FIG. 6 is a schematic perspective view of the 5.25 inches disk drive cover plate and computer panel 5 of the operation display panel of the present invention.
Figure 7:
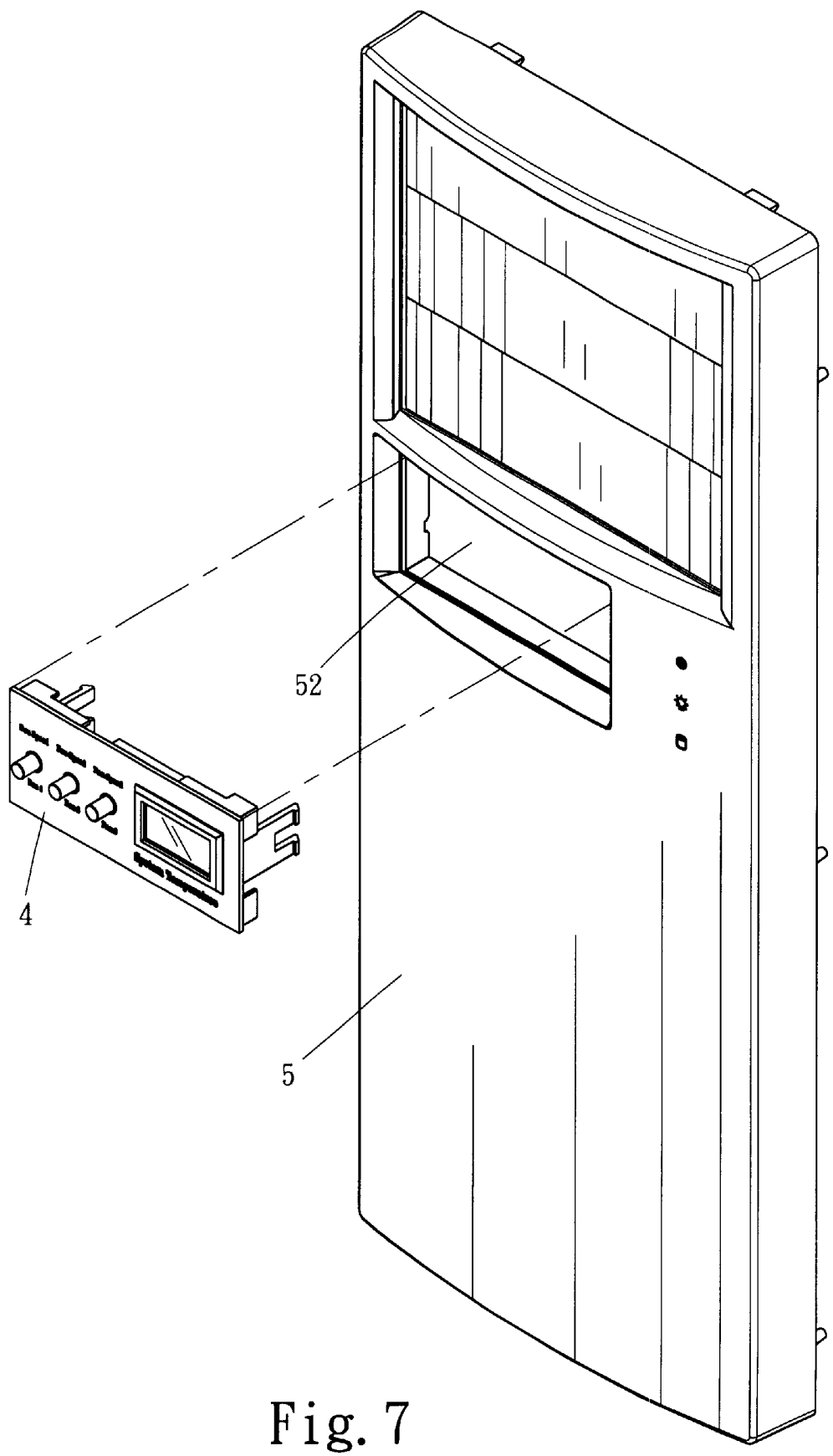
FIG. 7 is an exploded perspective view of the 3.5 inches disk drive cover plate and the computer panel 5 of the operation display panel of the present invention.
Figure 8:
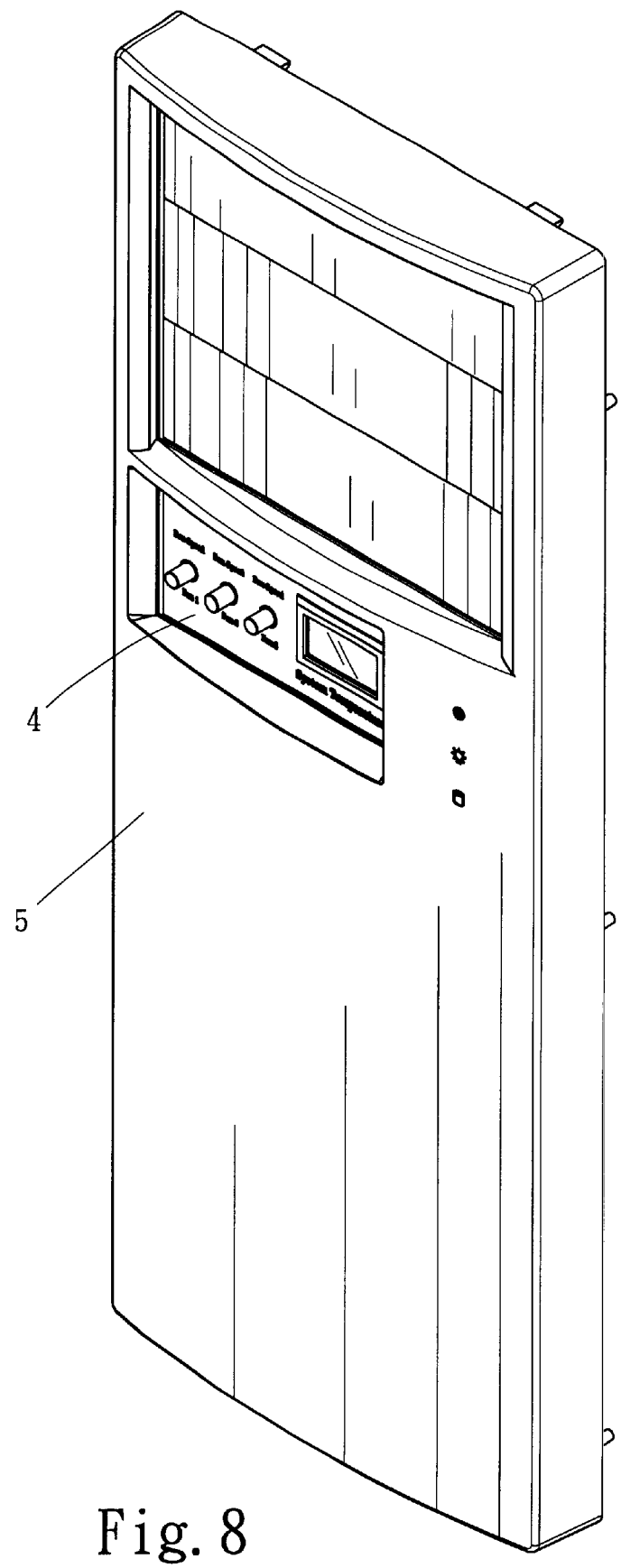
FIG. 8 is a schematic perspective view of the 3.5 inches disk drive cover plate and computer panel of the operation display panel of the present invention.
Figure 9:
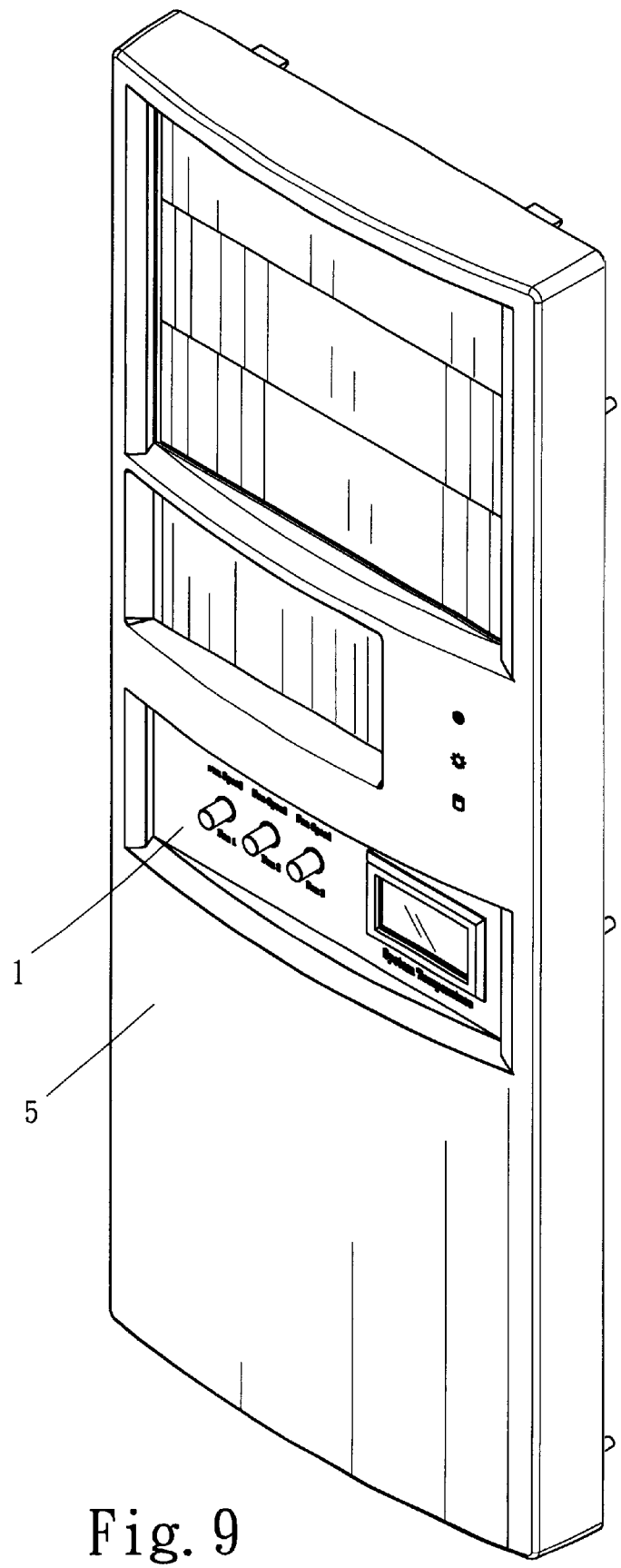
FIG. 9 is a schematic perspective view showing that the operation display panel of the present invention is directly combined to the computer panel 5 of another embodiment of the present invention.

Referring to FIG. 1, the automatic temperature display and fan rotary speed adjusting device of the present invention is illustrated. The device mainly includes an operation display panel 1 with a temperature display window and fan adjusting button. The operation display panel 1 has a temperature/fan rotary speed display window 11 and a fan adjusting button 12. The operation display panel 1 may be appended to a 5.25 inches disk drive frame 2 as shown in FIG. 2, or to a 5.25 inches disk drive cover plate 3 as shown in FIG. 3, or to a 3.5 inches disk drive cover plate 4 as shown in FIG. 4, or to a computer panel 5 as shown in FIG. 5.

The operation display panel 1 is made as a 5.25 inches disk drive frame 2. In the inner space of the disk frame supporting plate 21, a hard disk can be placed therein. Retaining holes 23 are formed in the lateral wall plate 22 so that the whole 5.25 inches disk drive frame 2 can be screwed to the disk drive frame on a computer casing. Two sides of the 5.25 inches disk drive cover plate 3 and 3.5 inches disk drive cover plate 4 are extended with symmetrical hooks 31, 41. Thereby, the 5.25 inches disk drive cover plate 3 and 3.5 inches disk drive cover plate 4 are placed in the 5.25 inches disk drive slot hole 51 and the 3.5 inches disk drive slot hole 52 in the computer panel 5. Then, they are hooked by hook 31 and hook 41 as illustrated in FIGS. 5 to 8.

In the present invention, no matter that the operation display panel 1 is combined to the computer panel 5 directly, or to the 5.25 inches disk drive frame 2, or to the 5.25 inches disk drive cover plate 3, or to the 3.5 inches disk drive cover plate 4, in each case, the operation display panel 1 is installed with a control circuit board 13, a thermometer 14 and a connecting terminal 15 connected to a heat dissipating fan. To have a clear FIG., in FIG. 3, the thermometer 14 and connecting terminal 15 are not illustrated.

The temperature/fan rotary speed display window 11 of the operation display panel 1 is connected to the thermometer 14. The thermometer 14 may be fixed or installed to the hard disk drive, central processing unit or computer, etc. An IC in a circuit board 13 will display the temperature measured by the thermometer 14 and the rotary speed of the fan on the temperature/fan rotary speed display window 11. The circuit of the fan adjusting button 12 is connected to the circuit board 13 and electric heat dissipating fan. The rotary speeds of the fans can be controlled by the fan adjusting button 12 directly.

Th user may use the display temperature on the operation display panel 1 to monitor the temperature of the computer and the rotary speeds of fans can be directly adjusted by the fan adjusting button 12 on the operation display panel 1 so as to improve the heat dissipation. Therefore, the temperature of the interior of a computer can be well controlled.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automatic temperature display and fan rotary speed adjusting device having an operation display panel which is capable of being connected to a disk drive frame, a cover plate or a computer panel, the operation display panel being installed with a temperature/fan rotary speed display window, and a fan adjusting button; the operation display panel being appended to a 5.25 inches disk drive frame, or a 5.25 inches disk drive cover plate, or a 3.5 inches disk drive cover plate, or a computer panel; thereby, by the temperature/fan rotary speed display window on the operation display panel, users can adjust the heat dissipating fan by a fan adjusting button on the operation display panel according to the temperature of an interior of the computer.

2. The automatic temperature display and fan rotary speed adjusting device as claimed in claim 1, wherein the operation display panel is appended to a 5.25 inches disk drive frame, an inner space of the disk drive frame is placed with a hard disk drive and the lateral wall plate has retaining holes for screwing the whole 5.25 inches disk drive frame in a computer casing disk frame.

3. The automatic temperature display and fan rotary speed adjusting device as claimed in claim 1, wherein the operation display panel is made as a 5.25 inches disk drive cover plate and a 3.5 inches disk drive cover plate, and hooks are used to fix the two.

4. The automatic temperature display and fan rotary speed adjusting device as claimed in claim 1, wherein the operation display panel is combined to the computer panel directly, or to the 5.25 inches disk drive frame, or to the 5.25 inches disk drive cover plate, or to the 3.5 inches disk drive cover plate, in each case, the operation display panel is installed with a control circuit board, a thermometer and a connecting terminal connected to a heat dissipating fan; the temperature/fan rotary speed display window of the operation display panel is connected to the thermometer; the thermometer is fixed or installed to the hard disk drive, central processing unit or computer; an IC in a circuit board will display the temperature measured by the thermometer and the rotary speed of the fan on the temperature/fan rotary speed display window; a circuit of the fan adjusting button is connected to the circuit board and electric heat dissipating fan; the rotary speeds of the fans is controllable by the fan adjusting button directly.

* * * * *